United States Patent [19]

Kaufhold et al.

[11] 4,061,687

[45] Dec. 6, 1977

[54] OXO PROCESS WITH RECOVERY OF COBALT HYDROCARBONYL IN SOLUTION FOR RECYCLE

[75] Inventors: Manfred Kaufhold; Horst-Dieter Wulf, both of Marl, Germany

[73] Assignee: Chemische Werke Huls Aktiengesellschaft, Marl, Germany

[21] Appl. No.: 566,523

[22] Filed: Apr. 8, 1975

Related U.S. Application Data

[63] Continuation-in-part of Ser. No. 315,823, Dec. 18, 1972, abandoned.

[30] Foreign Application Priority Data

Dec. 30, 1971 Germany ............................ 2165515

[51] Int. Cl.² .............................................. C07C 29/16
[52] U.S. Cl. ............................. 260/632 HF; 252/414; 252/428; 423/138
[58] Field of Search ................................ 260/632 HF

[56] References Cited

U.S. PATENT DOCUMENTS

| 2,564,130 | 8/1951 | Schreyer | 260/632 HF |
| 2,816,933 | 12/1957 | Mertzweiller | 260/638 HF |
| 3,014,970 | 12/1961 | Johnson et al. | 260/632 HF |

OTHER PUBLICATIONS

Lange, "Handbook of Chemistry", 10th Ed. (1961), pp. 440–441.
Luder et al., "General Chemistry", (1959), p. 160.

*Primary Examiner*—Joseph E. Evans
*Attorney, Agent, or Firm*—Gilbert L. Wells

[57] ABSTRACT

Method for the recovery of cobalt as cobalt hydrocarbonyl from a water mono- or diacid, cobalt salt solution which is obtained from the cobalt removal from oxo alcohols, preferably after the addition of higher olefins. These solutions are treated with carbon monoxide and hydrogen under high pressure and high temperature in the presence of an organic solvent wherein the water, mono- or diacid cobalt solutions are treated with carbon monoxide and hydrogen in the presence of butanol, in which the butanol to solution ratio ranges from 1:2 through 1:5 at a temperature of between about 140° C to 200° C and a pressure of between about 100 and 300 atmospheres in a homogenous phase followed by cooling between about 0° C and 110° C and separation of the butanol-cobalt hydrocarbonyl phase from the water phase.

9 Claims, No Drawings

OXO PROCESS WITH RECOVERY OF COBALT HYDROCARBONYL IN SOLUTION FOR RECYCLE

CROSS REFERENCES TO RELATED APPLICATIONS

The present application is a Continuation-In-Part of Application Ser. No. 315,823, filed Dec. 18, 1972 in the U.S. Patent Office and now abandoned.

Applicants claim priority under 35 U.S.C. 119 for Application P 21 65 515.2, filed Dec. 30, 1971 in the Patent Office of the Federal Republic of Germany. The priority document is contained in the file of the parent application Ser. No. 315,823.

BACKGROUND OF THE INVENTION

The field of the invention is the recovery of cobalt catalyst used in the oxo process.

The state of the prior art of the oxo process and the recovery of cobalt catalyst used therein may be ascertained by reference to the Kirk-Othmer "Encyclopedia of Chemical Technology", Vol. 14 (1967) under the section OXO PROCESS, on pages 373–390, particularly pages 375–376, which disclose the cobalt catalysts, and pages 383–384, which disclose the catalyst removal and recovery, and U.S. Pat. Nos. 2,767,048, 2,816,933 and 2,841,617 of Joseph K. Mertzweiller which issued Oct. 16, 1956, Dec. 17, 1957 and July 1, 1958 respectively.

Cobalt carbonyl compounds are used as catalysts in oxo reactions. The cobalt catalyst must be removed from the reaction product in order to avoid impurities which would disrupt reactions employing the compounds. This removal method is called "cobalt removal". One of the products of "cobalt removal" is a water solution of a cobalt salt. The cobalt compound (carbonyl) must be recovered in an active form in order to be reintroduced into further oxo methods in order to be economically feasible.

The recovery is obtained by contacting the cobalt salt solution with carbon monoxide and hydrogen (usually water gas) under high pressure and temperature in the presence of a solvent for the cobalt hydrocarbonyl produced in the reaction.

U.S. Pat. No. 2,767,048 of Joseph K. Mertzweiller which issued Oct. 18, 1956 discloses the process of preparing and separating an aqueous solution of a cobaltous salt of cobalt hydrocarbonyl suitable for catalyzing a reaction of an olefinic carbon compound with carbon monoxide and hydrogen. An aqueous solution of cobaltous acetate, which supplies $Co^{++}$ ions, is initially treated with a gaseous mixture of hydrogen and carbon monoxide in the presence of an inert oxygenated organic solvent therefore which is an aldehyde or an alcohol having at least 4 carbon atoms such as iso-octyl aldehyde or iso-octyl alcohol. This is done prior to contacting the solution with the olefinic carbon compound. The treatment takes place at a temperature between about 90° C and 180° C and a pressure of 1000 to 4000 p.s.i.g. The cobaltous acetate is maintained in the reaction mixture in amounts such that it provides $Co^{++}$ ions at least in sufficient amounts to combine with all $Co(CO_4)$ ions present in the aqueous phase. The unconverted gases are discharged from the resulting reaction mixture. The two phases of the reaction mixture are separated into an organic solvent phase and an aqueous phase containing the cobaltous salt of cobalt hydrocarbonyl. The aqueous phase containing the cobalt salt of cobalt hydrocarbonyl is then withdrawn. This aqueous phase containing the cobalt salt of cobalt hydrocarbonyl is not suitable for hydroforming of higher olefins ($C_6$ or higher) because of low miscibility with the oxo reaction mixture.

Because of this, the catalyst must be used with a solvent for the oxo reaction mixture. The cobalt formed in the organic phase in these methods is dicobalt octacarbonyl.

According to British Pat. No. 702,221, aromatic hydrocarbons, liquid olefins, cycloparaffins, ether, esters, alcohols such as octanol as well as high boiling point by-products of the oxo reactions are suitable for solvents for the dicobalt octacarbonyl. Aldehydes having 4–8 carbon atoms have been suggested for the same purpose by German Published Application (DT-AS) 1,767,277.

These methods have certain known inherent disadvantages such as the formation in the oxo reaction of a whole series of side products.

SUMMARY OF THE INVENTION

Under the reaction conditions many substances may be used as solvents for the catalyst which take part in the reaction. In order to avoid an increasing number of various high boiling point products, an alcohol should be used for the catalyst solvent which takes part in the reaction so that impurities from foreign substances are not introduced.

When higher olefins with chain lengths of about 10 to 15 carbon atoms are used in the oxo process, then the choice of increasingly higher alcohols for the cobalt catalyst is necessitated.

If octanol is employed together with the catalyst, difficulties arise since the alcohol must be separated from the final reaction mixture. This is practically impossible where a mixture of olefins of different carbon numbers are added to the reaction mixture. In addition, the prior art use of aldehydes as solvents for the catalyst has the disadvantage that, e.g., aldol, acetal and condensation products are encountered which are also difficult to separate from the reaction product. Furthermore, in this manner the solvent forms useless by-products.

The concept of the present invention lies in the discovery of a solvent for the method of recovering cobalt hydrocarbonyl from water cobalt salt solution obtained from cobalt removal from oxo alcohols, monoacid or diacid cobalt salt solution. This solvent must be cheap; it must be inert under reaction conditions; it must be easily separable from the oxo reaction mixture; and it must be both a solvent for the oxo reaction mixture and for the catalyst.

The problem has been solved according to the present invention by the following method in which cobalt hydrocarbonyl is recovered from a water cobalt salt solution obtained from cobalt removal from oxo alcohols. Preferably, the hydrocarbonyl is recovered after the addition of higher olefins, including monoacids and diacids by treating the water cobalt salt solution with carbon monoxide and hydrogen under high temperature and pressure in the presence of an organic solvent. The improvement of the present invention over the prior art comprises the treatment of the water monoacid or diacid solution with carbon monoxide and hydrogen in the presence of n-butylalcohol, isobutylalcohol, sec.-butylalcohol or mixtures thereof, where the butanol to solution ratio ranges from 1:2 through 1:5 at a temperature of 140° C to 200° C and a pressure of 100 to 300 atmospheres in a homogenous phase followed by cooling from 0° C - 110° C and separation of the butanol-cobalt hydrocarbonyl phase from the water phase.

In a preferred embodiment the oxo process for converting higher olefins having 10 - 15 carbon atoms in the presence of a catalyst comprising cobalt hydrocarbonyl dissolved in a solvent, hydrogen and carbon monoxide to the respective oxo alcohols and decobalting the oxo alcohols with a first aqueous solution of an organic acid having 1 to 3 carbon atoms to form a second aqueous solution of an organic cobalt acid salt having 1 to 3 carbon atoms, is improved by:

a. using a solvent consisting essentially of an alcohol selected from the group consisting of n-butylalcohol, isobutylalcohol, sec-butylalcohol and mixtures thereof;

b. treating the second aqueous solution in the presence of this solvent with a gaseous mixture of carbon monoxide and hydrogen at a temperature between about 140° to 200° C and a pressure between about 100 to 300 atmospheres to form a homogenous liquid phase;

c. cooling the homogenous liquid phase at a temperature of about 0° C to 110° C and thereby separating the homogenous liquid phase into an aqueous liquid phase and an organic liquid phase consisting essentially of butanol and cobalt hydrocarbonyl; and d. recycling the organic liquid phase as the cobalt hydrocarbonyl dissolved in a solvent.

DESCRIPTION OF THE PREFERRED EMBODIMENTS

The recovery of the cobalt hydrocarbonyl is as follows: the water solution obtained from the cobalt extraction containing monoacid and diacid, and in the presence of butanol at a temperature of 140° C - 200° C and a pressure of from 100 - 300 atmospheres, is treated with a mixture of carbon monoxide and hydrogen where the mixture varies between the volume ratios of 2:1 to 1:2. Isobutyl alcohol, n-butyl alcohol, and sec-butyl alcohol are suitable for use as the butanol component.

Formic acid, acetic acid, propionic acid and oxalic acid are examples of suitable mono and diacids. These acids are present to the extend of 1 to 20 percent in solutions employed for the extraction of cobalt from solutions of the same. In spite of the fact that butanol, as well as the other above-mentioned butyl alcohols and mixtures of the same are contemplated for use at temperatures above 130° C, they are completely miscible. It was unexpectedly discovered that a reaction occurred in contrast to the opinion expressed in the literature that the cobalt hydrocarbonyl after cooling and separation is found in the butyl alcohol phase.

The lower limit of the temperature range for separating the two phases containing the unreacted cobalt and the second phase containing the butanol-cobalt hydrocarbonyl is the freezing point at which the mixture separates or about 135° C. With increasing temperature, however, the water content of the butyl alcohol phase increases. Because of the affect of the water content on the speed of the hydroforming reaction, it is preferable to employ a temperature of no higher than 110° C. The most desirable temperature range lies in the range of 20° C - 80° C.

After the phase separation the cobalt hydrocarbonyl butyl alcohol phase is reintroduced as a catalyst into the oxo reaction. The water phase containing the non-reacted cobalt salts and the excess monoacid or diacid are reintroduced into the cobalt removal system.

One of the advantages of the method of the invention is that the use of butanol in the oxo reaction forms no by-products. Even if side reactions were a problem, the butanol can easily be separated from the side reactions along with the cobalt hydrocarbonyl in order that the butanol can also be reused. In addition, the butanol does not introduce side reaction impurities which, for example, would contaminate the paraffin produced in the reaction respectively being fed in admixture with the higher olefins into the reaction so that the paraffin may be further used in the production of olefins without intermediate purification. This is of special advantage with respect to the production of higher olefins in the one reaction since earlier prior art solvents for cobalt hydrocarbonyl extraction would either chemically change or would be difficult to separate. A further advantage is that butanol forms a homogenous solution at the 140° - 200° C temperature employed in the treating of the cobalt salt solution in the presence of carbon monoxide, hydrogen and butanol. Furthermore, it is possible to dispense with the otherwise prior art required mixing apparatus in order to mix the water phase and organic phase.

The organic cobalt salts of the present invention which supply $Co^{++}$ ions include alkanoates having 1 to 18 carbon atoms, such as cobalt formate, cobalt acetate, cobalt naphthenate, cobalt octoate, cobalt stearate, cobalt oleate, cobalt palmitate, cobalt propionate and cobalt oxalate.

The invention can be carried out in batch processing, however, it is more advantageous to employ continuous production.

EXAMPLES

The following examples aid in understanding the invention.

EXAMPLE 1.

Synthesis gas (55 percent hydrogen, 45 percent carbon monoxide) is introduced at the bottom of a pressure reactor having a 2.5 liter capacity under a pressure of about 280 atmospheres. At the same time while stirring, in order to mix the gases with the liquid, 500 ml of isobutyl alcohol and 900 - 1000 ml of a water solution of cobalt formate (having 0.83 percent by weight computed as cobalt metal) and 10 percent formic acid is introduced per hour. The temperature of the reactor is held at 180° C. The reaction time is about 1.5 to 2 hours. A homogenous solution is taken from this reactor by cooling it to 70° C and introducing it into a second separation pressure container in which the butyl alcohol and water phases are separated. At the same time, a valve in the lid of the pressure container is opened releasing the gas at the rate of one cubic meter/hour which gas may be reintroduced into the oxo reactor.

The organic phase contains the cobalt hydrocarbonyl.

The water phase contains 0.31 percent to 0.33 percent cobalt which constitutes 60 percent of the original cobalt salt which can be separated in the form of cobalt hydrocarbonyl.

EXAMPLE 2 (Comparative Example)

This test is carried out in the same manner as that of Example 1 except that instead of isobutyl alcohol an oxo alcohol ($C_{13}$–$C_{14}$) is employed. It was obvious at the conclusion of the test that the desired reaction had not occurred. The organic phase was weak gray because of the precipitated metal and the water phase was dark red. The cobalt content of the water phase remained substantially the same.

EXAMPLE 3

2,580 g of a mixture consisting of 28.5 percent olefin and 71.5 percent paraffin, (which paraffin consists of 75 percent of $C_{12}$ and 25 percent $C_{13}$ compounds) and 510 g of the isobutyl alcohol solution of cobalt hydrocarbonyl (cobalt content of 0.5 percent) was introduced into a reaction chamber as in Example 1, together with synthesis gas (55 percent $H_2$ and 45 percent CO) at a temperature of about 170° C under a pressure of from 280 to 300 atmospheres.

After 3 hours reaction time, the autoclave was cooled and the mixture was separated. Finally the raw product was hydrogenated and had the following identification value:

acid number; 0.56
ester number; 0.84
hydroxy number; 74.0
carbonyl number; 0.11

From this hydrogenated product 2,643 g of oxo alcohol was taken for distillation. After the butanol and water was distilled off the paraffin remained which consisted of 1,764 g. The oxygen content of the paraffin was less than 0.05 percent, i.e., the paraffin was free of alcohol. The first main cut comprised 560 g of oxo alcohol while 88 g of high boiling point constituents remained in the distillation column. Gas chromatic analysis of the oxo alcohol indicated $C_{13}$ – and $C_{14}$ oxo alcohol with a purity of 99.8 percent.

We claim:

1. In the oxo process for converting higher olefins having 10 – 15 carbon atoms in the presence of a catalyst comprising cobalt hydrocarbonyl dissolved in a solvent, hydrogen and carbon monoxide to the respective oxo alcohols and decobalting said oxo alcohols with a first aqueous solution of an organic acid having 1 to 3 carbon atoms to form a second aqueous solution of an organic cobalt acid salt having 1 to 3 carbon atoms, the improvement comprising:
    a. said solvent consisting essentially of a butanol selected from the group consisting of n-butylalcohol, isobutylalcohol, secbutylalcohol and mixtures thereof;
    b. treating said second aqueous solution in the presence of said solvent with a gaseous mixture of carbon monoxide and hydrogen at a temperature between about 140° to 200° C and a pressure between about 100 to 300 atmospheres to form a homogenous liquid phase;
    c. cooling said homogenous liquid phase at a temperature of about 0° C to 110° C and thereby separating said homogenous liquid phase into an aqueous liquid phase and an organic liquid phase consisting essentially of butanol and cobalt hydrocarbonyl; and
    d. recycling said organic liquid phase as said cobalt hydrocarbonyl dissolved in a solvent.

2. The process of claim 1, wherein the volume ratio of said solvent to said second aqueous solution is about 1 to 2 through 1 to 5.

3. The process of claim 2, wherein said cooling of step (c) is carried out at a temperature of about 20° C to 80° C.

4. The process of claim 2, wherein the volume ratio of carbon monoxide to hydrogen in treatment step (b) is about 2 to 1 through 1 to 2.

5. The process of claim 1, wherein said organic acid is selected from the group consisting of formic acid, acetic acid, propionic acid and oxalic acid.

6. The process of claim 1, wherein said aqueous liquid phase of step (c) is recycled as said aqueous solution in said decobalting.

7. The process of preparing and separating an organic solution of cobalt hydrocarbonyl and catalyzing with said organic solution a reaction of an olefinic carbon compound with carbon monoxide and hydrogen which comprises initially treating an aqueous solution of an organic cobalt salt comprising a cobalt alkanoate having 1 to 18 carbon atoms which supplies $Co^{++}$ ions with a gaseous mixture of hydrogen and carbon monoxide in the presence of a butanol selected from the group consisting of n-butylalcohol, isobutylalcohol, secbutylalcohol and mixtures thereof at a temperature from 140° to 200 ° C, a volume ratio of said butanol to said aqueous solution of about 1 to 2 through 1 to 5, and pressures from about 100 to 300 atmospheres in homogenous liquid phase, cooling said homogenous liquid phase and discharging unconverted gases from the resulting reaction mixture, separating an organic liquid phase comprising the thus obtained butanol-cobalt hydrocarbonyl phase from an aqueous phase, recycling said organic liquid phase for said catalyzing a reaction and recycling said aqueous phase as a portion of said aqueous solution.

8. The process of claim 5, wherein said organic acid is present in said first aqueous solution to the extent of 1 to 20 percent.

9. In the oxo process for converting higher olefins having 10 – 15 carbon atoms in the presence of a catalyst comprising cobalt hydrocarbonyl dissolved in a solvent, hydrogen and carbon monoxide to the respective oxo alcohols and decobalting said oxo alcohols with a first aqueous solution of an organic acid selected from the group consisting of formic acid, acetic acid, propionic acid and oxalic acid to form a second aqueous solution of an organic cobalt acid salt, the improvement comprising:
    a. said solvent consisting essentially of a butanol selected from the group consisting of n-butylalcohol, isobutylalcohol, secbutylalcohol and mixtures thereof, in a volume ratio of said solvent to said second aqueous solution of about 1 to 2 through 1 to 5;
    b. treating said second aqueous solution in the presence of said solvent with a gaseous mixture of carbon monoxide and hydrogen at a temperature between about 140° to 200° C and a pressure between about 100 to 300 atmospheres to form a homogenous liquid phase;
    c. cooling said homogenous liquid phase at a temperature of about 0° C to 100° C and thereby separating said homogenous liquid phase into an aqueous liquid phase and an organic liquid phase consisting essentially of butanol and cobalt hydrocarbonyl; and
    d. recycling said organic liquid phase as said cobalt hydrocarbonyl dissolved in a solvent.

* * * * *